US011491067B2

(12) United States Patent
Souris

(10) Patent No.: US 11,491,067 B2
(45) Date of Patent: Nov. 8, 2022

(54) BIODEGRADABLE COFFIN ASSEMBLY

(71) Applicant: Mea Souris, Tinderbox (AU)

(72) Inventor: Mea Souris, Tinderbox (AU)

( * ) Notice: Subject to any disclaimer, the term of this patent is extended or adjusted under 35 U.S.C. 154(b) by 0 days.

(21) Appl. No.: 16/337,232

(22) PCT Filed: Sep. 28, 2017

(86) PCT No.: PCT/AU2017/000204
§ 371 (c)(1),
(2) Date: Mar. 27, 2019

(87) PCT Pub. No.: WO2018/058171
PCT Pub. Date: Apr. 5, 2018

(65) Prior Publication Data
US 2019/0298598 A1 Oct. 3, 2019

(30) Foreign Application Priority Data
Sep. 28, 2016 (AU) .............................. 2016903936

(51) Int. Cl.
*A61G 17/007* (2006.01)
*A61G 17/04* (2006.01)
(Continued)

(52) U.S. Cl.
CPC ..... *A61G 17/0073* (2013.01); *A61G 17/0106* (2017.05); *A61G 17/028* (2017.05);
(Continued)

(58) Field of Classification Search
CPC .. A61G 17/00; A61G 17/007; A61G 17/0073; A61G 17/02; A61G 17/044;
(Continued)

(56) References Cited

U.S. PATENT DOCUMENTS 2,063,421 A * 12/1936 Donahey ................ A61G 19/00
27/35
2,076,677 A * 4/1937 Smith .................... A61G 17/02
27/35
(Continued)

FOREIGN PATENT DOCUMENTS

AU 2010100898 10/2010
GB 180282 5/1922
(Continued)

OTHER PUBLICATIONS

International Search Report for PCT/AU2017/000204, dated Jan. 2, 2018.
(Continued)

*Primary Examiner* — William L Miller
(74) *Attorney, Agent, or Firm* — Stephen J. Weyer, Esq.; Stites & Harbison, PLLC

(57) ABSTRACT

A coffin for use in the containment and storage of a human or animal corpse. The coffin comprises; a tubular housing comprising a wall defining an internal space; the wall formed from a cellulose fibre material and capable of retaining the corpse in the internal space. The coffin further comprises a part which receives and retains a body when in use. The invention is essentially a cylindrical, tubular form, to form a receptacle to serve as a cremation/burial vessel, free of corners, angles and sharp edges and manufactured from a biodegradable material. The invention contemplates use of screws—preferably stainless steel to secure those elements such as the end walls which require releasable fixation. One suitable non-toxic biodegradable material is recycled cellulose fibre such as cardboard or used paper products. Other materials used in construction of the invention include, plantation timber framing, plywood end closures, screw fixation, water based adhesive as required,
(Continued)

nontoxic water based paint, and quantities of water based craft adhesive.

10 Claims, 16 Drawing Sheets

(51) Int. Cl.
    *A61G 17/02*         (2006.01)
    *A61G 19/00*         (2006.01)

(52) U.S. Cl.
    CPC ......... *A61G 17/036* (2017.05); *A61G 17/041* (2016.11); *A61G 17/044* (2016.11); *A61G 17/0405* (2017.05); *A61G 19/00* (2013.01)

(58) Field of Classification Search
    CPC ............... A61G 17/041; A61G 17/028; A61G 17/0106; A61G 17/036; A61G 17/0405; A61G 17/034; A61G 19/00; A61G 2203/90; E04H 13/00
    USPC .............. 27/2, 4, 14, 16, 17, 27, 35; 52/128, 52/138–141
    See application file for complete search history.

(56) References Cited

U.S. PATENT DOCUMENTS

| | | | | |
|---|---|---|---|---|
| 3,133,334 A * | 5/1964 | Johnsen | ................. | A61G 17/02 27/27 |
| 3,188,712 A * | 6/1965 | Bauermeister | ......... | A61G 17/00 27/6 |
| 3,348,280 A * | 10/1967 | Myers | ................... | A61G 17/00 27/2 |
| 3,581,452 A * | 6/1971 | Jalbert | ................... | E04H 13/00 52/133 |
| 3,613,189 A * | 10/1971 | Kirby | ..................... | A61G 17/02 27/35 |
| 3,681,820 A * | 8/1972 | Jalbert | ................. | A61G 17/007 27/7 |
| 3,898,718 A * | 8/1975 | Eubank | .................. | A61G 17/00 27/35 |
| 4,328,606 A * | 5/1982 | Nunes | .................... | A61G 17/00 27/35 |
| 4,788,757 A * | 12/1988 | Bethune | ................. | A61G 17/00 27/12 |
| 6,167,600 B1 * | 1/2001 | Williams | .............. | E04H 13/006 27/1 |
| 6,493,911 B1 * | 12/2002 | Train | ..................... | A61G 17/08 125/20 |
| 7,204,003 B2 * | 4/2007 | Davis | ..................... | A61G 17/00 27/19 |
| 7,703,186 B1 * | 4/2010 | Williamson | .......... | A61G 17/02 27/2 |
| 8,127,414 B2 * | 3/2012 | Rankin | ................... | A61G 17/02 27/27 |
| 8,214,978 B1 * | 7/2012 | Moran | ................. | A61G 17/02 220/345.2 |
| D872,412 S * | 1/2020 | Mullins | ........................... | D99/1 |
| 2002/0144383 A1 * | 10/2002 | Spence | ............... | A61G 17/048 27/35 |
| 2003/0024089 A1 * | 2/2003 | Dziekonski | ........... | A61G 17/08 27/1 |
| 2003/0066173 A1 | 4/2003 | Reece | | |
| 2004/0221435 A1 | 11/2004 | Pentz | | |
| 2007/0050958 A1 * | 3/2007 | Scruggs | ................. | A61G 17/02 27/2 |

FOREIGN PATENT DOCUMENTS

| | | | |
|---|---|---|---|
| JP | H-11-113985 | | 4/1999 |
| JP | 2021171234 A | * | 11/2021 |

OTHER PUBLICATIONS

Written Opinion of the International Searching Authority for PCT/AU2017/000204, dated Jan. 2, 2018.

* cited by examiner 51  60 52 65 54  55 62  61 67 59 78 79 80 81 82 66 56  58 53 57   50

87 53 54 50 78 76 79 80 81 77 82 88

95 90 91 93 94 92 96

91   92   98   97   96

100   101      102   105      103   104   106

100    101    103    102    104    105

100  101  105  135  103, 104    136  106    102

BIODEGRADABLE COFFIN ASSEMBLY

BACKGROUND

The present invention relates generally to storage apparatus and equipment for the management of cadavers and in particular to a biodegradable coffin assembly which is economic to manufacture, convenient to use and is environmentally friendly (bio-degradable). More particularly the invention relates to a coffin assembly including an external sleeve housing and an internal co-operating storage receptacle for holding a body and capable of separation from the housing. The present invention also provides a tubelike coffin manufactured in two parts, a top part and bottom part with the bottom part having integrated therewith or co operation with at least one support members. The invention is primarily applicable to funeral coffins, however, it is to be appreciated that the invention is not to be construed as limited to that application and that the apparatus to be described below has many other applications for storage of bodies during such events as natural disasters war and disasters occurring in the built environment.

PRIOR ART

There are in existence a variety of coffin types used in the funeral industry. An example of the known art is disclosed in EP 11723232 which teaches an environmentally friendly coffin made of paper pulp which is sufficiently stiff to be fit for the purpose for which it was intended. Prior to this coffins were made from paper pulp like materials but they suffered from structural weakness and want of durability, particularly in the load bearing parts—usually located at the carry points of the coffin. The coffin disclosed in this patent is adapted with vertical recesses directed inwards which cover the coffin box and the lid. At each side of the coffin box bottom a transverse pipe is placed. The bottom part of the coffin is reinforced such that the coffin can be lifted without breaking in the middle and so that the weight content is evenly distributed through a transverse lever in each side.

In another example of the prior art, U.S. Pat. No. 4,034,447 discloses a coffin for a human body made from paper mache and which was provided with strengthening ribs which were also intended to provide a decorative effect.

As can be seen from the aforesaid prior art, there have been numerous solutions provided for carriage and storage of bodies with each essentially purpose built but usually formed in a traditional shape. Other examples of coffins are disclosed in the following publications—DE 4330151A1, DE102008034116B3, WO2009-137894, WO03/037241.

There is a long felt want in the industry to provide improvements in coffins to accommodate the wide variety of circumstances in which coffins are required such as but not limited to war and natural disasters which are environments for mass casualties. There is also an increasing need to provide a more economic and environmentally acceptable coffins which also accommodate the need to bury more people in a smaller area. There is a further need to provide an improved coffin which satisfies the fundamental requirements for coffins but provides economic, aesthetic, user friendly, environmental and practical advantages over the known art.

INVENTION

The present invention provides an alternative to the known coffins and particularly those made from biodegradable materials such as cellulose fibre (cardboard) and lightweight materials. The invention is primarily applicable to lightweight coffins and it will be convenient to hereinafter describe the invention in relation to that exemplary application. However, it is to be appreciated that the invention is not to be construed as limited to that application.

The invention provides a generally tubular coffin which is an alternative to the known coffins which is economic simple to construct conveniently stowable as a permanent or temporary casket and which provides increased and more efficient storage for a corpse and with all the attributes of the known art. The invention further provides a coffin which is quick and easy to manufacture, lightweight readily stackable and transportable and includes support formations which enable ground engagement or engagement with an associated support.

In its broadest form the present invention comprises:
a coffin for use in the containment and storage of a human or animal corpse, the coffin comprising; a tubular housing comprising a wall defining an internal space; the wall formed from a cellulose fibre material and capable of retaining the corpse in the internal space; the coffin further comprising integral or detachable formations which provide support and enable the coffin to resist unwanted axial rotation when in use. According to one embodiment, the tubular coffin retains therein a drawer like receptacle which receives and retains a body therein and which is releasable from the tube longitudinally. According to an alternative embodiment the coffin is provided in two part co-operating to form the tube one of which parts forms a lid and the other of which part forms a ground engaging base having formations which resist unwanted axial rotation of the coffin.

According to one embodiment, the first part is a lower half of an integrally connected hemisphere. According to another embodiment the first part is a half of the coffin divided along a longitudinal length of the coffin. According to another embodiment the first part is a drawer like member which fits inside the tubular housing. The housing according to a preferred embodiment is a cylindrical cellulose fibre tubular formation formed from at least one piece of cellulose fibre material. According to an alternative embodiment, the cylindrical housing is manufactured from two co-operating opposing halves one pivotally connected to the other such that the top half forms a lid.

In another broad form the present invention comprises:
a coffin for use in the containment and storage of a human or animal corpse, the coffin comprising; a tubular housing having a wall defining an internal space; the wall formed from a cellulose fibre material and capable of retaining the corpse in the internal space; the coffin further comprising a drawer like receptacle which receives and retains a body when in use and which is removable from the housing.

Preferably, the receptacle is removable axially via an end of the housing or by separation of one hemispherical part from an opposing hemispherical part which together form the tubular housing. According to a preferred embodiment the coffin body is formed as a cylindrical tube and cut longitudinally along its long axis at an equatorial location. It will be appreciated that the dividing cut can be effected at an alternative latitude depending upon the relative sizes of the lid and receptacle required for each coffin.

In another broad form the present invention comprises:
a coffin manufactured from cellulose fibre, the coffin comprising a tubular body forming a housing capable of receiving and retaining therein a human or animal body; the housing formed from at least one part and including a body retention recess and ground engaging elements which support and stiffen the coffin.

According to one embodiment, the tubular body is cylindrical. According to one embodiment the housing is formed from two co-operating halves with one said halves defining an internal recess to retain a body. According to an alternative embodiment, the tubular body receives and retains therein a co-operating removable insert which retains said body.

Preferably, the coffin is made from a biogradable material (preferably cellulose fibre), is tubular and is manufactured so that it comprises two opposing parts which may either be halves or each having different circumferential extent as long as they co-operate in engagement. Ideally the junction between the two part will occur close to a notional equator.

The terminating wall edges on each part of the coffin preferably have a stiffener which is either integral with the wall such as a thickening or inwardly directed edge return portion or a separate strut fitted at or near wall edges. The tube shape essentially disguises the shape of the corpse contained in the coffin which is preferred in some cultures. Also, the tubular geometry eliminates sharp edges and corners and contributes to the structural capacity of the coffin but strength may be enhanced by wall thickening and including reinforcing such as reinforcing ribs.

In one embodiment saddles are provided to receive and retain the coffin. Preferably circular saddles conforming to an external wall contour of the coffin provide ground engaging support and stability. According to one embodiment the saddles are integral with the coffin walls by moulding or formation during manufacture. Alternatively the saddles are separate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

The present invention provides an alternative to the known prior art and the shortcomings identified. The foregoing and other objects and advantages will appear from the description to follow. In the description reference is made to the accompanying representations, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying illustrations, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

The invention will be better understood and objects other than those set forth above will become apparent when consideration is given to the following detailed description thereof. Such description will now be described in more detail according to a preferred but non limiting embodiment and with reference to the accompanying illustrations wherein.

DETAILED DESCRIPTION

The present invention will now be described in more detail according to a preferred embodiment but non limiting embodiment and with reference to the accompanying illustrations. The examples referred to herein are illustrative and are not to be regarded as limiting the scope of the invention. While various embodiments of the invention have been described herein, it will be appreciated that these are capable of modification, and therefore the disclosures herein are not to be construed as limiting of the precise details set forth, but to avail such changes and alterations as fall within the purview of the description.

The invention will be described with reference to one embodiment comprising a closed tube having end walls which may be removable and to an alternative but preferred form in which the tube is formed from two opposing but co-operating parts. Throughout the specification a reference to tubular can be taken to be a reference to a tube of any feasible shape such as cylindrical, square, triangular, rectangular but cylindrical is a preferred cross sectional profile.

Figure 1:
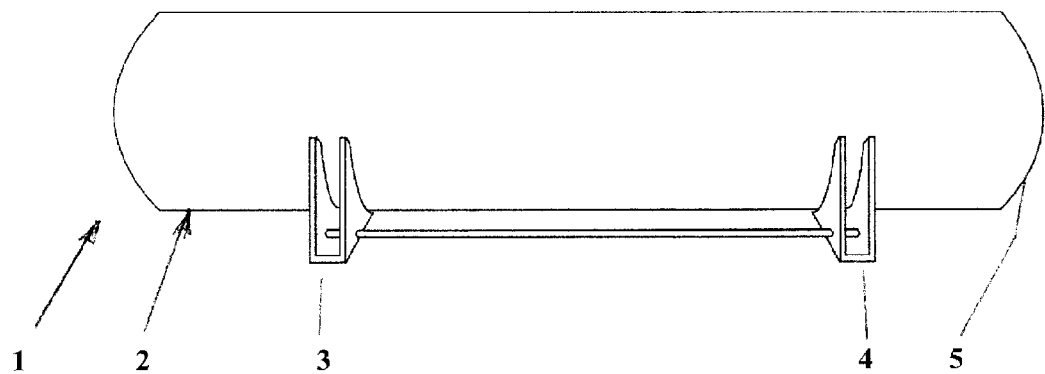
FIG. 1 shows a side elevation view of a coffin according to one embodiment and mounted on supports.

Referring to FIG. 1 there is shown a side elevation view of a coffin assembly 1 according to one embodiment comprising a cellulose tubular housing 2 mounted on ground engaging supports 3 and 4. Supports 3 and 4 are arranged in the nature of saddles which accommodate a circular external wall 5 of housing 2. Housing 2 comprises a cylindrical tube manufactured from cellulose fibre and is preferably a strong cardboard manufactured according to one conventional methodology as a helical spiral. Other methods of constructions are contemplated. As will be described below with reference to alternative embodiments, the coffin assembly 1 can be made in two co operating parts which are preferably two halves.

Figure 2:
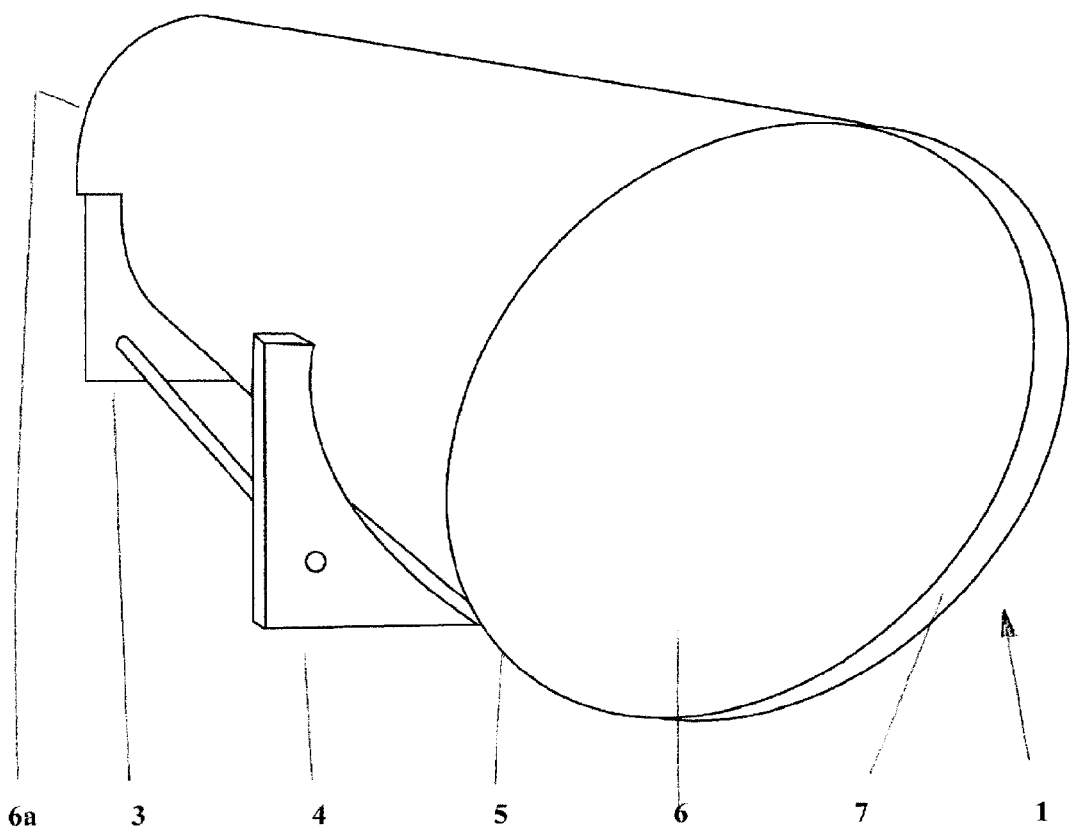
FIG. 2 shows a perspective view of the coffin of FIG. 1 revealing an end closure.
Figure 3:
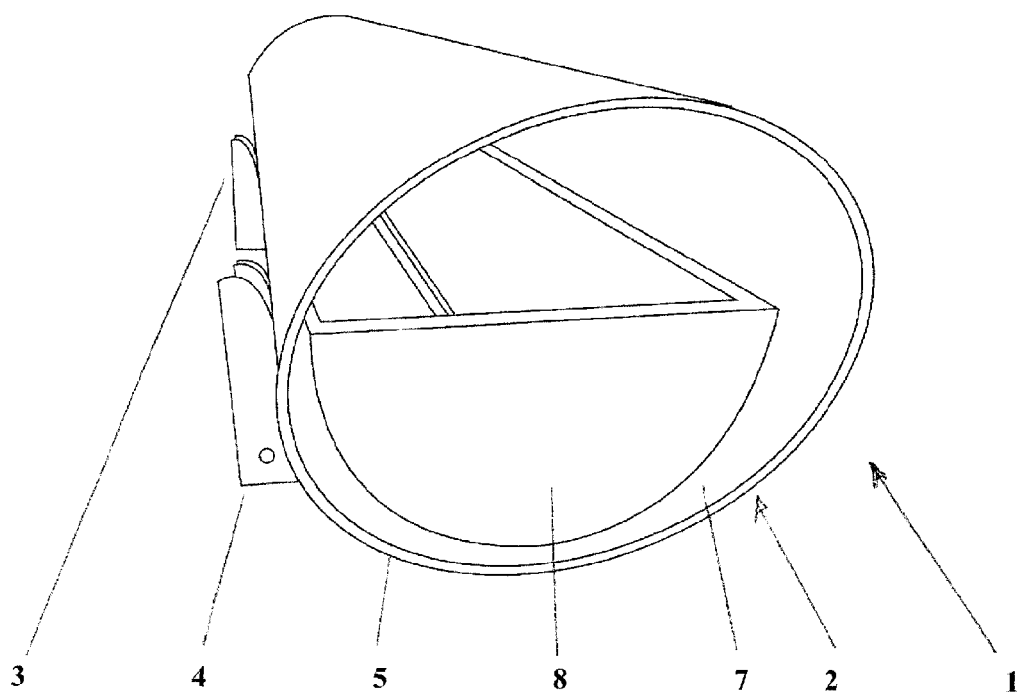
FIG. 3 shows the coffin of FIG. 1 from an end perspective and with the end closure removed to reveal the insert receptacle.

FIG. 2 shows with corresponding numbering a perspective view of the coffin assembly 1 of FIG. 1 revealing end closure 6 which seals an internal space 7 (see also FIG. 3). Support saddles 3 and 4 are constructed to generally conform to the shape of the external contour of circular wall 5. Coffin assembly 1 comprises a single closed one piece tube with openings at either end to receive end wall enclosures 6 and 6a (obscured). There is no top section or separable lower section. In this case the tube is manufactured as one piece. According to one embodiment end closures 6 and 6a are light plywood or other suitable lightweight and biodegradable material. Saddles 3 and 4 may also be manufactured from plywood or other suitable fit for purpose material capable of supporting the weight of the coffin and contents.

FIG. 3 shows the coffin assembly of FIG. 1 mounted on supports 3 and 4 from an end perspective and with the end closure 6 removed to reveal an insert receptacle 8 which is located in and fully contained by internal space 7. Internal receptacle 8 is operable in a drawer like manner in that it may be slid longitudinally from the housing 2. In use, receptacle 8 receives and retains a corpse of a deceased and which may be moved independently of housing 2.

Figure 4:
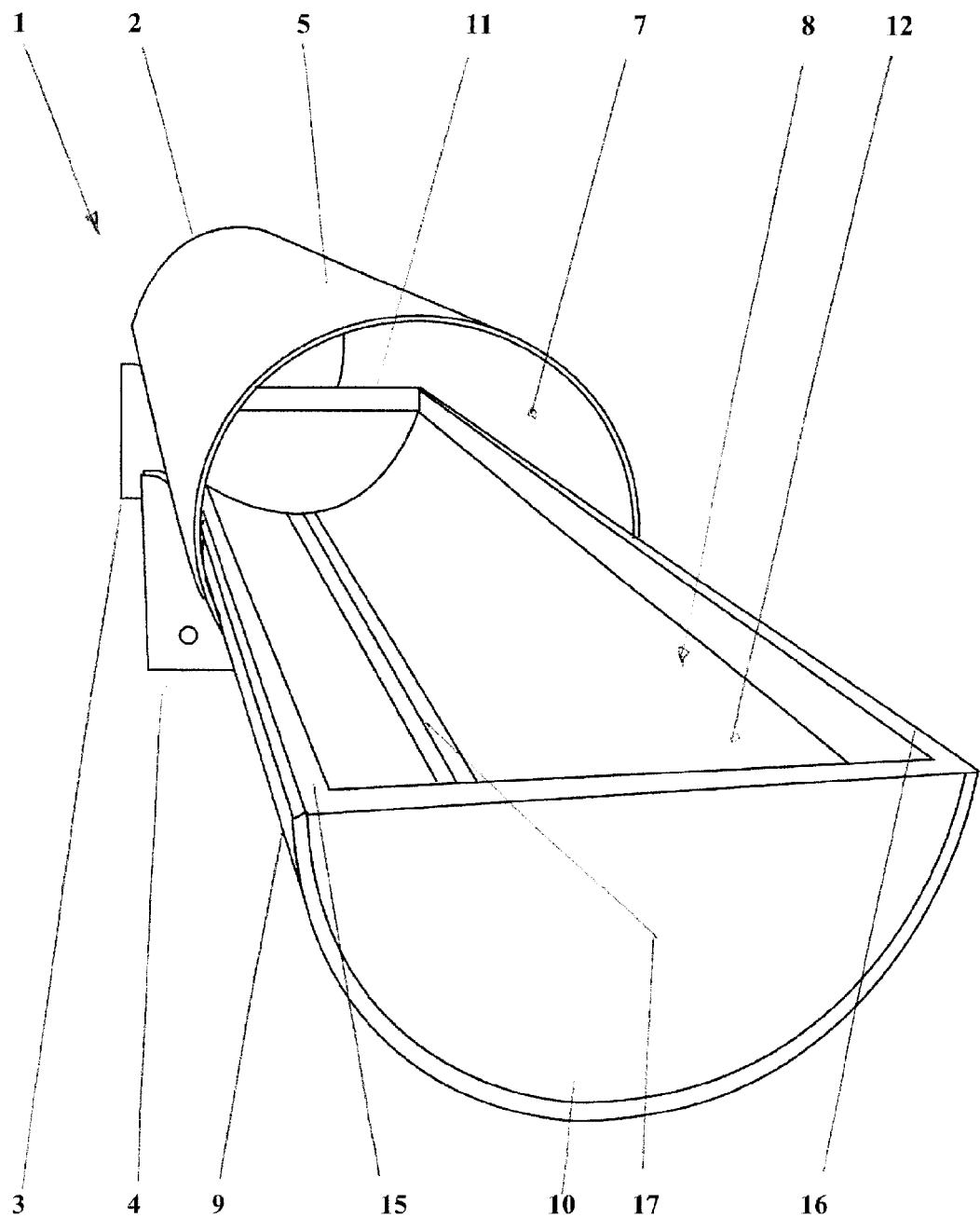
FIG. 4 shows a perspective view of the coffin with the insert receptacle partially removed from the inside of the coffin housing.

FIG. 4 shows with corresponding numbering a perspective view of the coffin assembly 1 mounted on supports 3 and 4, with insert receptacle 8 partially removed from the inside space 7 of the tubular coffin housing 2. Receptacle 8 preferably comprises hemispherical wall 9, first end 10 and second end 11 (see also FIG. 5) which defines an internal space 12 which in use receives and retains a corpse (not shown). Assembly 1 includes in receptacle 8 reinforcing struts 15, 16 and rib 17.

Figure 5:
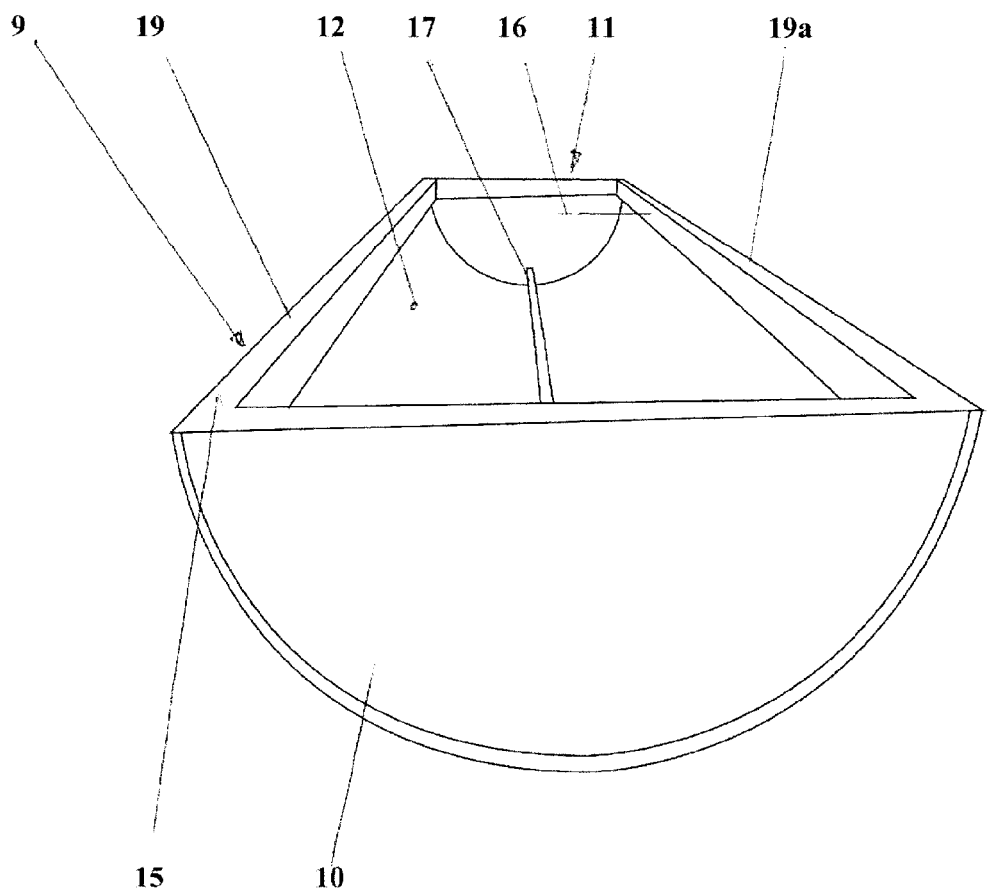
FIG. 5 shows the insert receptacle isolated from the coffin housing.

FIG. 5 shows the insert receptacle 8 isolated from the coffin housing 2. Receptacle 8 preferably comprises hemispherical wall 9, first end 10 and second end 11 which defines internal space 12. According to a preferred embodiment, wall 9 terminates at one edge in edge reinforcing member 13 and at an opposite edge in reinforcing member 14. First end 10 is reinforced with reinforcing strut 15 and second end 11 is likewise strengthened with reinforcing strut 16. In addition to peripheral edge reinforcement there is provided at least one longitudinal rib 17 which in use increase hoop stress resistance. Reinforcing struts 15, 16 and rib 17 may be formed by a separate member such as a suitable length of timber fixed to ends 10 & 11 respectively.

Alternatively the reinforcing struts 15, 16 and 17 may be formed into the edges in the manufacturing process of the cellulose fibre end walls 10 & 11. Hemispherical wall 9 is reinforced with longitudinal struts 19 and 19a; walls of the wall 9, by a return at the wall edges. Receptacle 8 slides in and out of space 7. It will be appreciated by persons skilled in the art that receptacle 8 can be formed in an alternative shape and also may be adapted with means to facilitate insertion and removal from housing 2 such as but not limited to the use of slides, rollers or the like. According to one embodiment, a sliding tray (receptacle 8) contains the body and is inserted into the tubular wall 9. In an alternative embodiment, the receptacle 8 which receives the tray can be coupled with an adjacent tray to form a lid.

Figure 6:
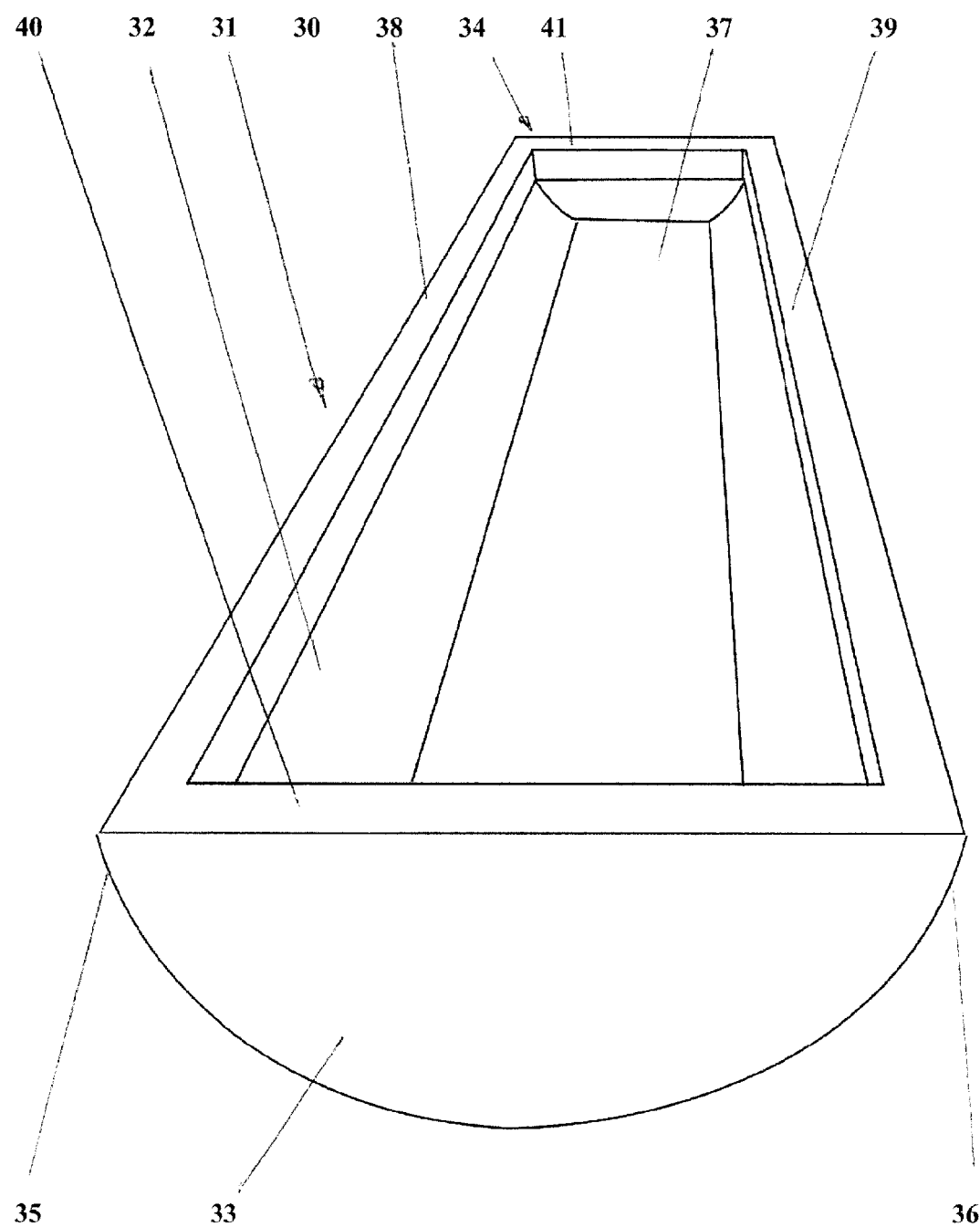
FIG. 6 shows an alternative drawer embodiment.

FIG. 6 shows a perspective view of an open coffin 30 comprising a cellulose tubular housing 31. Housing 31 comprises a cylindrical tubular/circular wall 32 manufactured from cellulose fibre and is preferably a strong cardboard manufactured according to conventional methodology. Coffin 30 includes end walls 33 and 34 and spanning therebetween for the longitudinal extent are side walls 35 and 36 which define internal space 37. According to a preferred embodiment, wall 32 terminates at one edge in edge reinforcing member 38 and at an opposite edge in reinforcing member 39. First end 33 is reinforced with reinforcing strut 40 and second end 34 is likewise strengthened with reinforcing strut 41.

Figure 7:
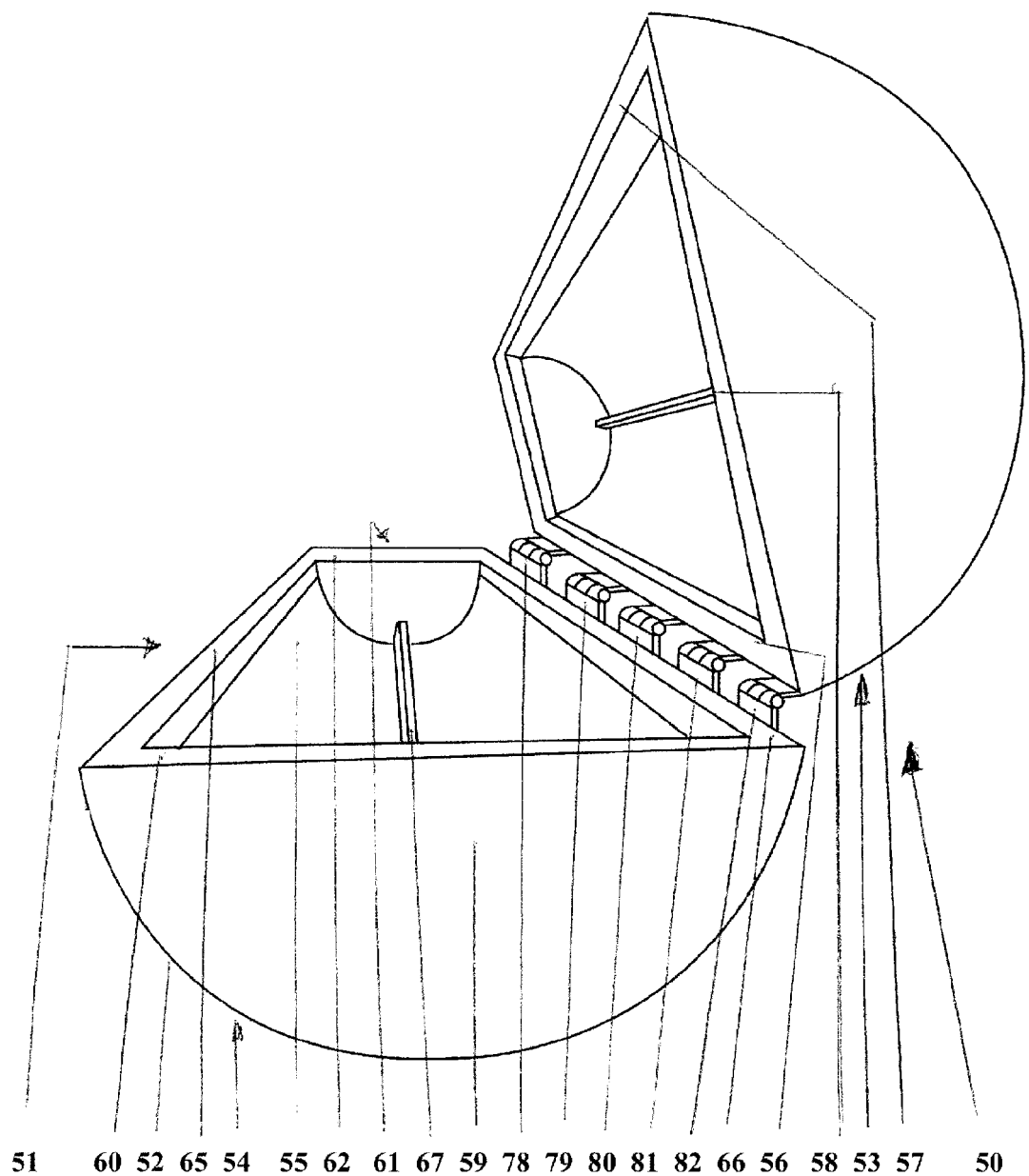
FIG. 7 shows an end perspective view of a hinged two part coffin according to an alternative embodiment.

FIG. 7 shows an end perspective view of an open coffin indicating its construction in two preferably hemispherical opposing halves joined by hinges. Coffin assembly 50 according to an alternative embodiment comprising a cellulose tubular housing 51 mounted on ground engaging supports (not shown but similar to supports 3 and 4) described earlier and which are arranged in the nature of saddles which accommodate a circular external wall 52 of housing 51. Housing 51 comprises a cylindrical tube manufactured from cellulose fibre and is preferably a strong cardboard manufactured according to conventional methodology such as but not limited to a helical spiral—for example wound cardboard—but it will be appreciated that other methods of manufacture of cellulose fibre walls are feasible.

If formed from a helical spiral the coffin can be subject to longitudinal cutting to separate into the two parts. From this view it can be seen that housing 51 is divided into two opposing hemispherical halves 53 and 54 connected by hinges 78, 79, 80, 81 and 82. Top half 53 includes in internal space 55, reinforcing struts 56 and 57 and central rib 58. Bottom part 54 comprises a first end 59 reinforced by strut 60, second end 61 reinforced by strut 62. Wall 52 is reinforced by longitudinal struts 65 and 66 and intermediate strut 67.

Figure 8:
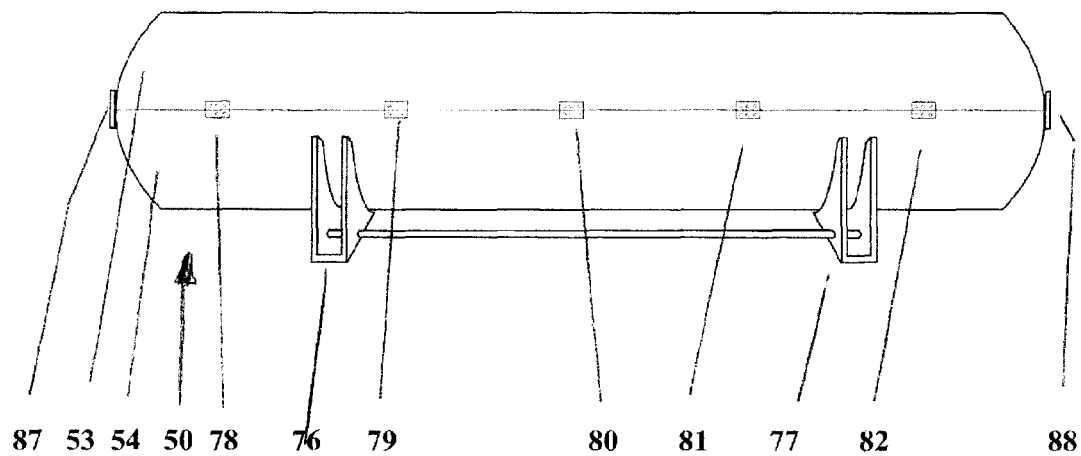
FIG. 8 shows a side elevation view of a coffin having a hinged lid and disposed in a support cradle.

FIG. 8 shows a side elevation view of the hinged coffin assembly 50 having a hinged lid 53 and bottom half 54 disposed in support cradles 76 and 77. Halves 53 and 54 are shown attached via hinges 78, 79, 80, 81 and 82 to allow the top half 53 to be rotated away from bottom half 54 exposing an internal space 55 (as shown in FIG. 7). Coffin 50 includes locking closures 87 and 88 at opposite ends of assembly 50.

Figure 9:
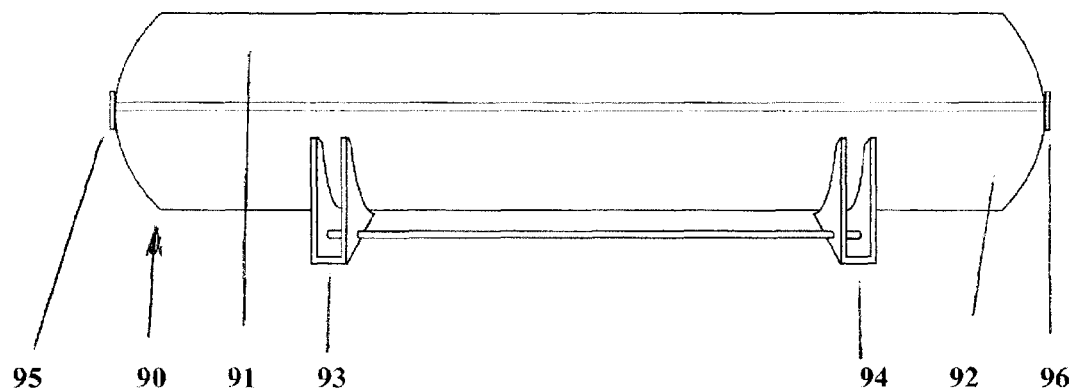
FIG. 9 shows a side elevation view of a two part coffin tube comprising upper hemispherical part and lower hemispherical part with end locks and retained by ground engaging supports.

FIG. 9 shows a side elevation view of a coffin tube assembly 90 comprising upper hemispherical part 91 and lower hemispherical part 92 mounted on ground engaging supports 93 and 94 and with end closure locks 95 and 96.

Figure 10:
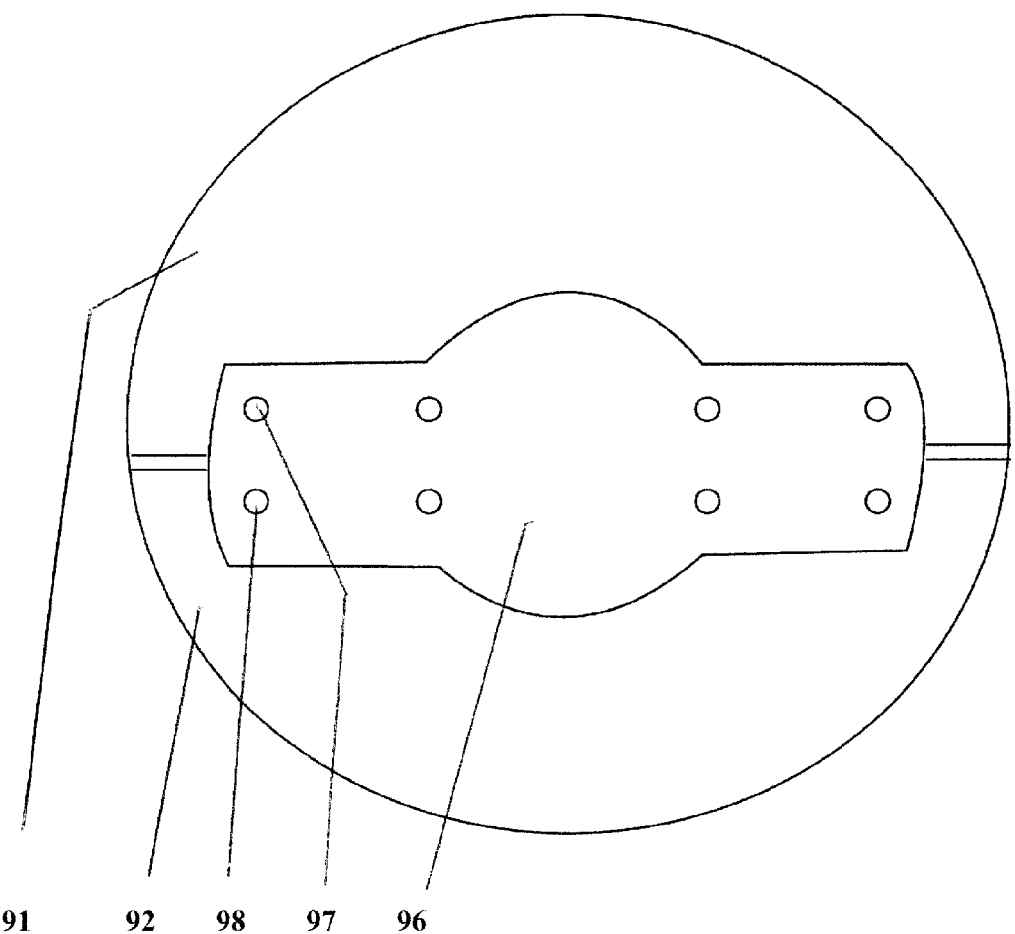
FIG. 10 shows an enlarged view of the locking element mounted on an end of the coffin of FIG. 9.

FIG. 10 shows an end view of the coffin tube assembly 90 comprising upper hemispherical part 91 and lower hemispherical part 92 retained by ground engaging supports 93 and 94 (see FIG. 9). Coffin tube assembly 90 includes an end panel closure 96 for locking of respective hemispherical parts 91 and 92. Locking closure panel 96 is fixed to coffin upper part 91 and lower part 92 by standard fixings such as but not limited to bolts or screws. Locking closure 95 (see FIG. 9) which is obscured in this view, is fitted to the opposite end of coffin assembly 90. Locking closure 96 is fixed to upper part 91 via row of fasteners 97 and to lower part 92 via a row of fasteners 98.

Figure 11:
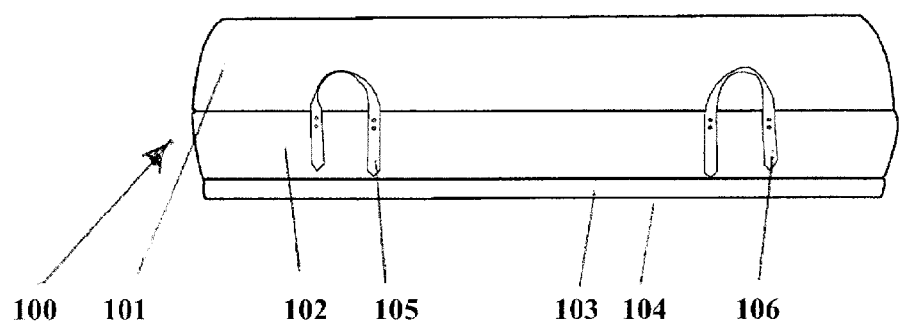
FIG. 11 shows according to an alternative embodiment a side elevation of a coffin including bottom support rails and carry handles.

FIG. 11 shows according to an alternative embodiment a side elevation of a coffin assembly 100 including upper part 101 and bottom part 102 and support rails 103 and 104 (obscured) and carry handles 105 and 106. Unlike the earlier embodiments described the coffin rather than resting on saddles, is provided with integrally attached radial formations or support rails 103 and 104 which support the coffin and resist unwanted axial rotation.

Figure 12:
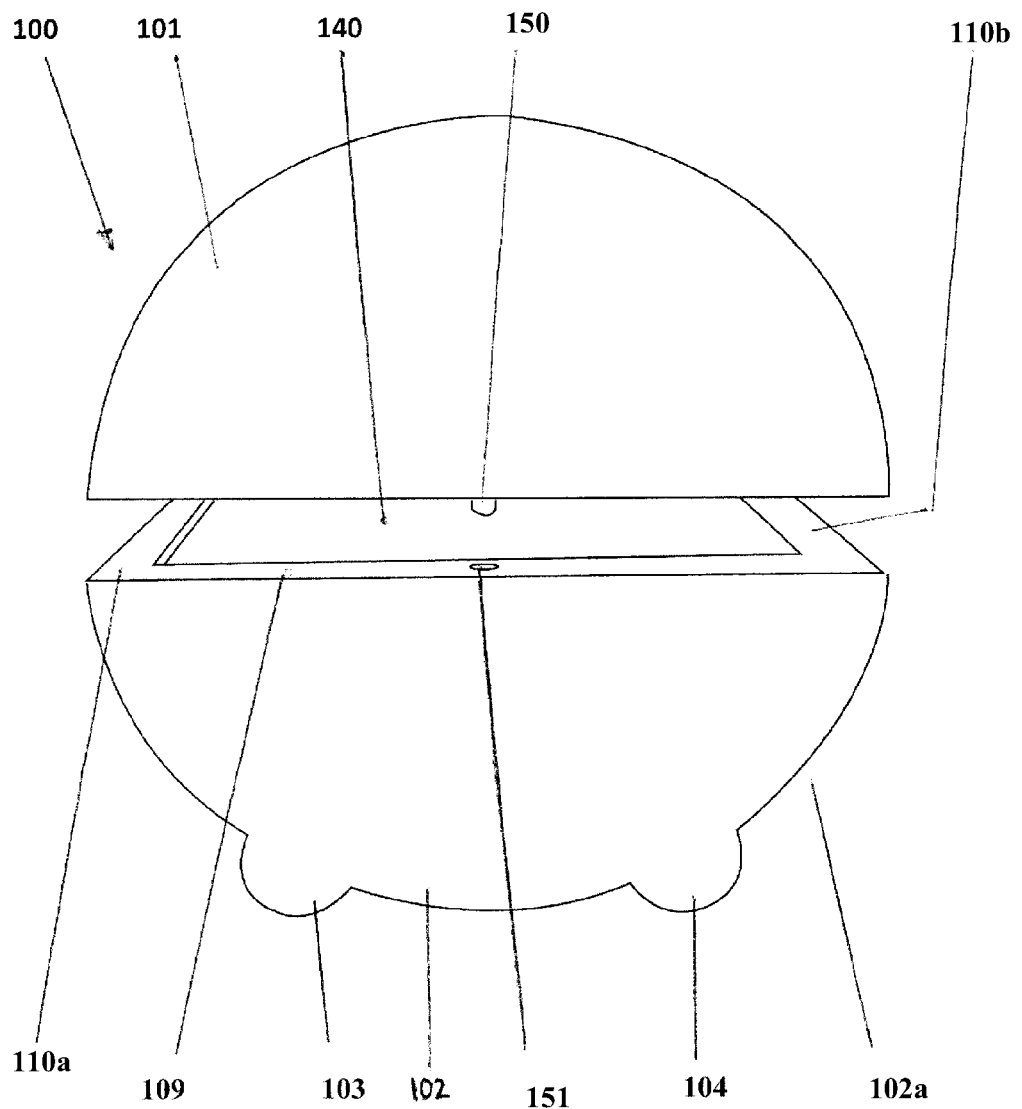
FIG. 12 shows an end elevation of the coffin of FIG. 11 with the lid separated from the lower part.

FIG. 12 shows with corresponding numbering, an exploded view of an end elevation of the coffin of FIG. 11. Support rails 103 and 104 may be attached to contoured surface 102a of bottom part 102 or they may be moulded into the surface 105. In the embodiment shown, support rails are formed by attachment of rails to surface 105 which are then covered as shown. Rails may be formed by attaching timber lengths to surface 105 then covering the timber. The cover is either an attachment or is moulded over the timber rails during the manufacturing process.

Assembly 100 is shown with upper lid part 101 separated from lower part 102. This exposes cavity 140 which will either receive an insert in which a corpse is laid or a corpse laid directly in cavity 140. Upper part 101 includes locating male lug 150 which may be formed from a piece of dowel and which locates in recess 151 facilitating alignment of upper and lower parts 101 and 102. It will be appreciated that additional locating/locking lugs can be disposed about the periphery of end edge plateau 109 and side plateaus 110a and 111b.

Figure 13:
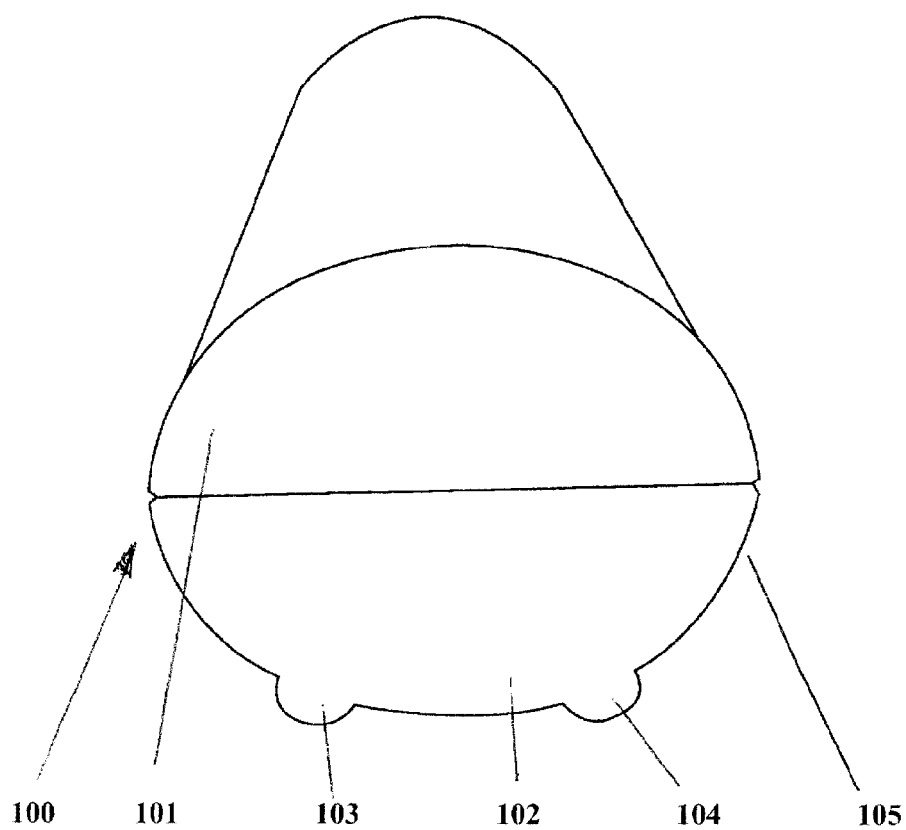
FIG. 13 shows a closed configuration of the embodiment of FIG. 12 with lid and base part engaged.

FIG. 13 shows with corresponding numbering a closed configuration of the embodiment of FIG. 12. In this case the upper part 101 is engaged with bottom part 102.

Figure 14:
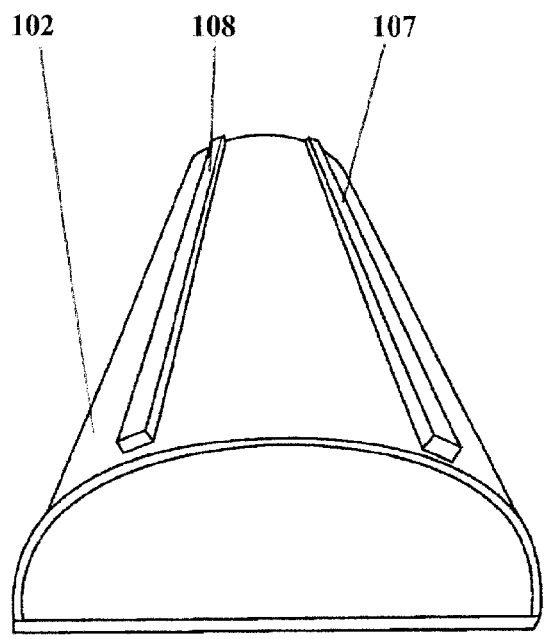
FIG. 14 shows a bottom part profile inverted to expose bottom support rails.

FIG. 14 shows bottom profile 102 inverted to expose bottom support timber rails 107 and 108. Rails 107 and 108 are connected according to conventional means such as but not limited to gluing, screwing or bolting. To complete the coffin, support rails 107 and 108 are covered and form support formations 103 and 104 as shown in FIG. 13.

Figure 15:
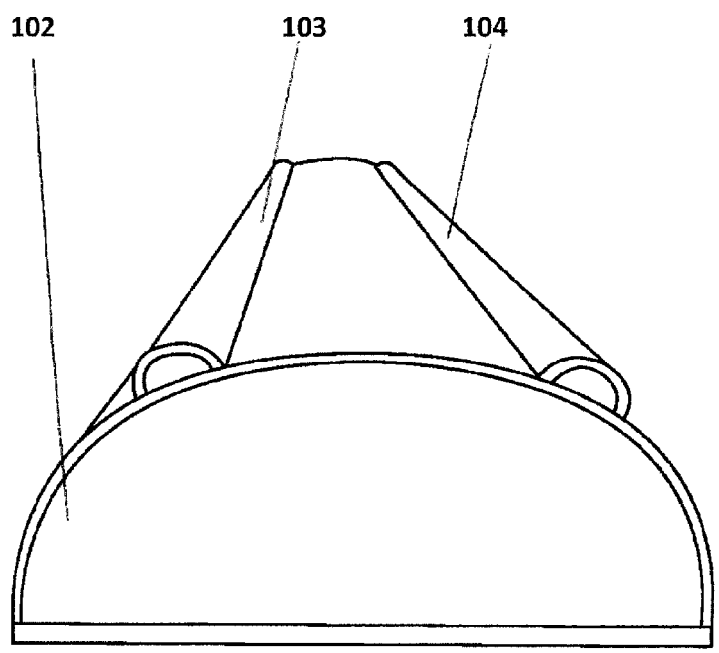
FIG. 15 shows the coffin of FIG. 14 with covers fitted over the rails to provide ground engaging support.

FIG. 15 shows the bottom profile 102 with covers 103 and 104 fitted over the ground engaging rails 107 and 108.

Figure 16:
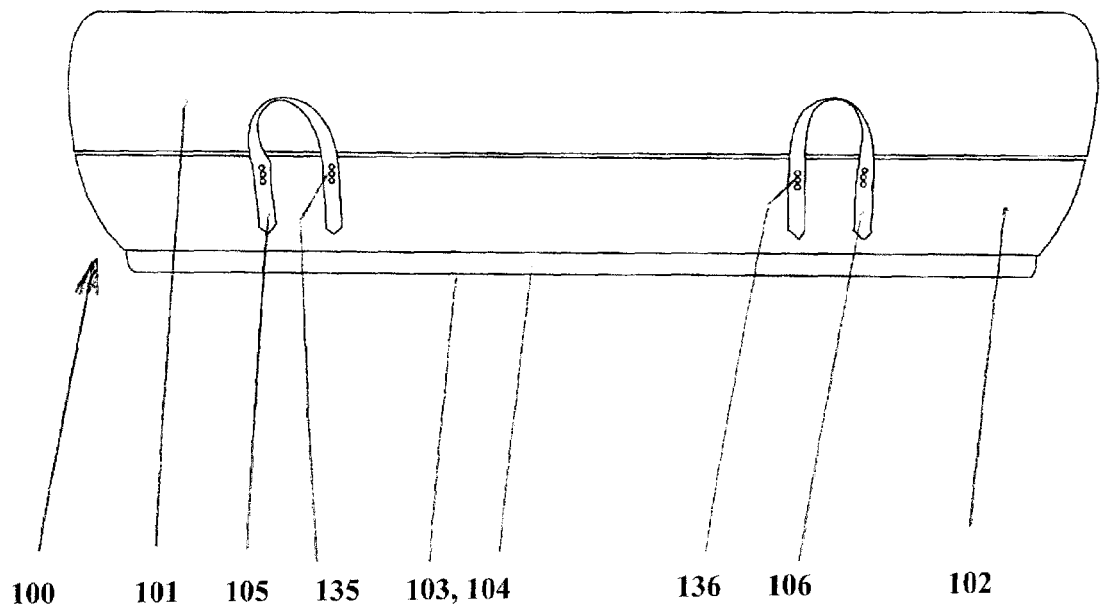
FIG. 16 shows an enlarged side elevation view of the coffin of FIG. 11 with detail of handle and bottom rails.

FIG. 16 shows an enlarged side elevation of the coffin 100 of FIG. 11. Coffin assembly 100 includes upper part 101 and bottom part 102 and support rails 103 and 104 (obscured) and carry handles 105 and 106. Handles 105 and 106 are connected to the bottom part 102 preferably via screws 135 and 136. Rails 151 and 152 are formed into the body of bottom half 102 and are disposed at optimal radial positions to enhance lateral stability of coffin assembly 100. Although handles 105 and 106 are shown as straps, it will be appreciated that alternative handles types are contemplated such as metallic, timber, plastics.

Alternatively handles may be moulded/formed into the body of bottom part 102. Preferably the handles are leather and are securely screwed through the biodegradable material tube wall, and anchored into the internal timber frame. Rails 151 and 152 which run the full length of the base section 102 of the pod, are screwed into place through the coffin wall, and into internal timber struts which run the full length of the base section of the pod.

Figure 17:
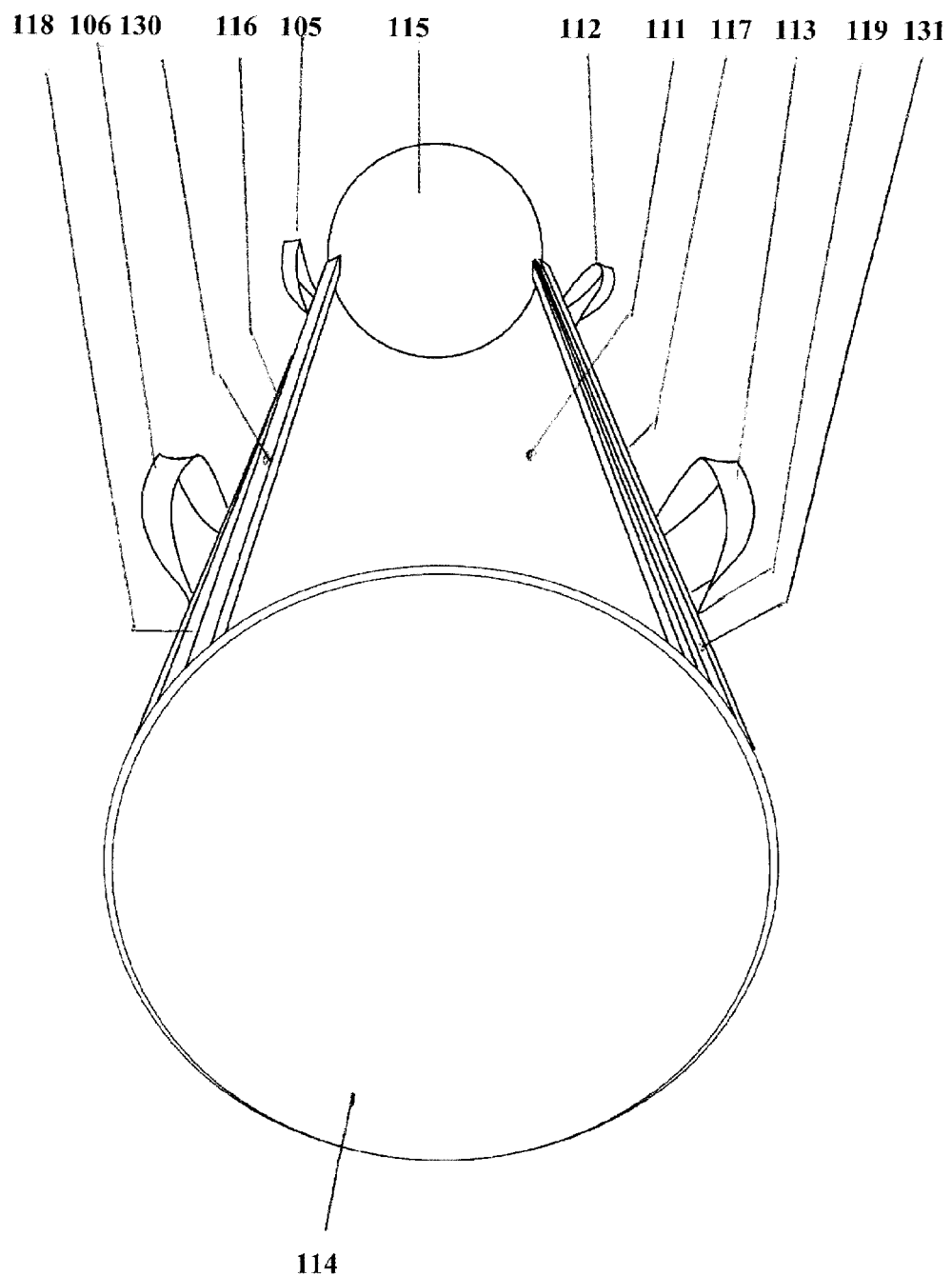
FIG. 17 shows an end perspective view of the embodiment of FIG. 16 with the lid removed.

FIG. 17 shows the embodiment of FIG. 16 from an end elevation with the lid upper part 101 removed to expose internal recess 111. Additional handles 112 and 113 are fixed to opposite side of bottom part 102 in locations which correspond to the handles 105 and 106. Coffin assembly 100 includes end walls 114 and 115 which together with wall edges 116 and 117 define internal recess 111. Bottom part 102 further comprises reinforcing struts 118 and 119. End walls 114 and 115 are preferably provided as plywood discs securely screwed into place through the tube wall, & into the internal timber frame at a base region of the coffin. Support rails run the full length of the base section of the pod, & are screwed into place through the recycled paper tube wall, & into the internal timber beams which run the full length of the base section of the pod. Grooves 130 and 131 are formed to receive corresponding edges 126 and 127 on top cover 103 (see FIG. 19).

Figure 18:
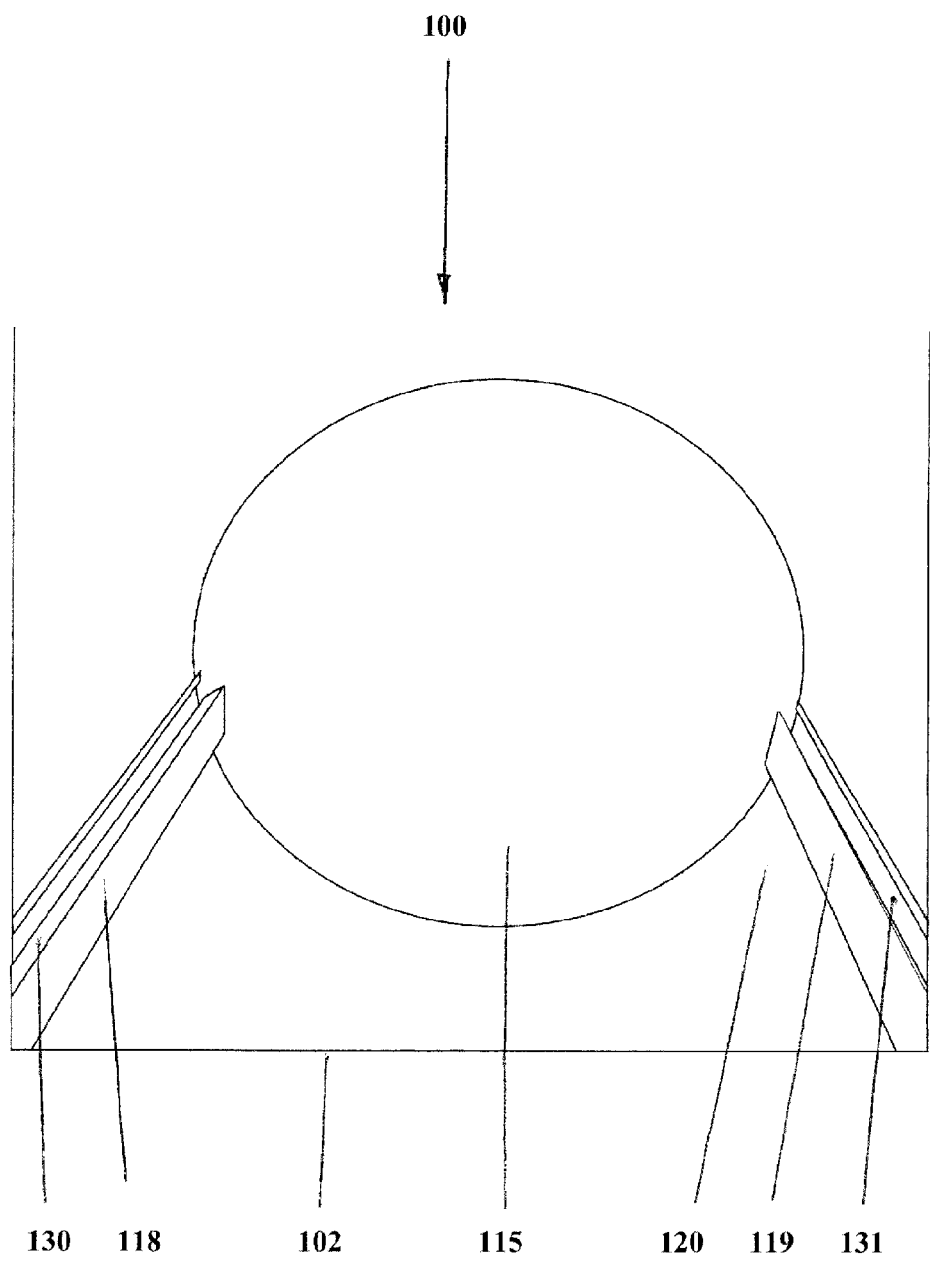
FIG. 18 shows an abbreviated enlarged perspective view showing side internal reinforcing rails.

FIG. 18 shows an abbreviated enlarged view of coffin assembly 100 showing end wall 115 reinforcing struts 118 and 119 fixed to internal surface 120 of bottom part 102. Struts 118 and 119 in addition to providing some reinforcing of part 102 also provide co operating engagement with struts 121 and 122 (see FIG. 19). Grooves 130 and 131 are enlarged.

Figure 19:
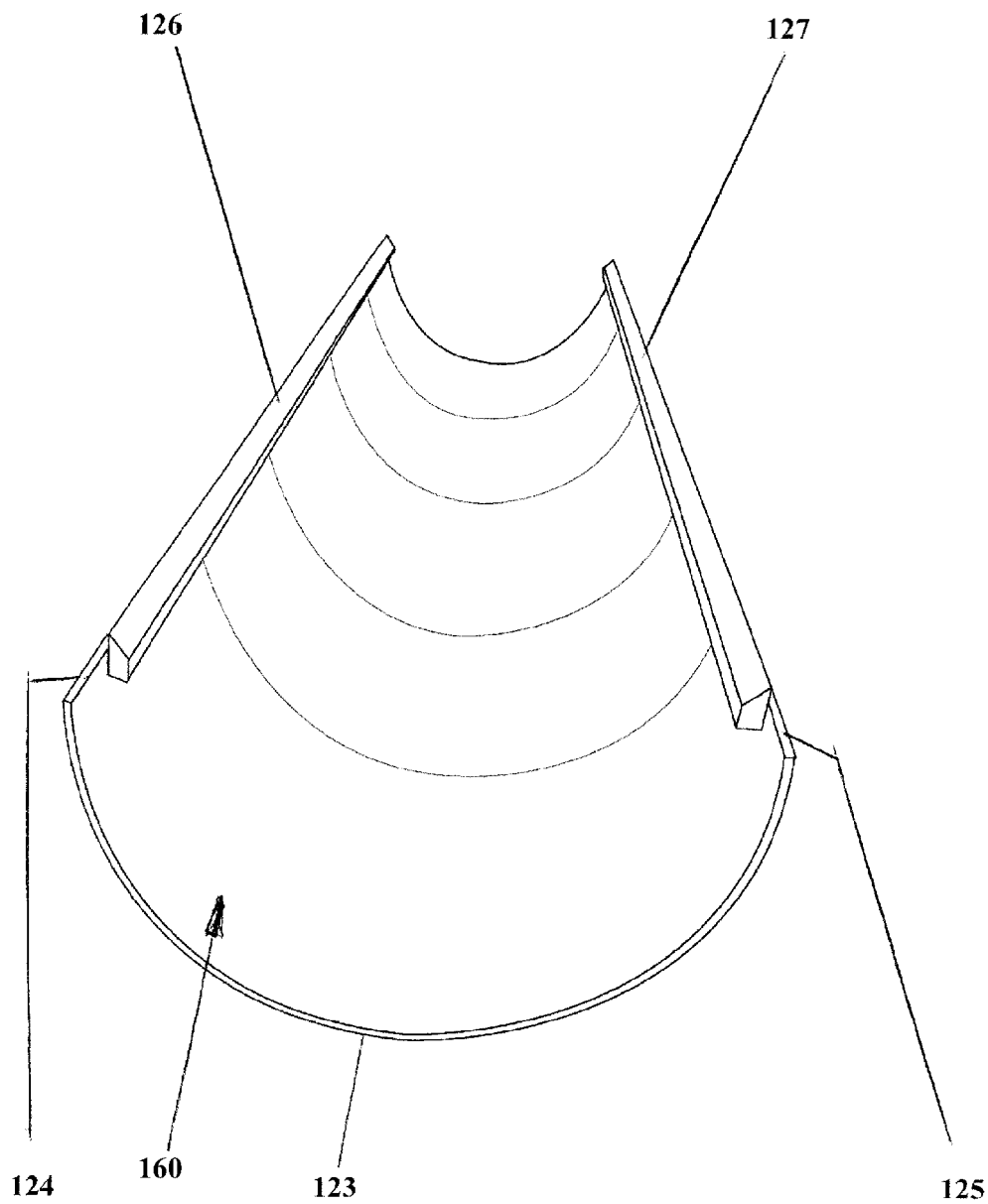
FIG. 19 shows a bottom engaging top half and side reinforcing.

FIG. 19 shows a top part 160 inverted and isolated from coffin assembly 100. Top part 103 comprises contoured wall 123 terminating in edges 124 and 125. Edges 124 and 125 receive and retain struts 126 and 127 which in use engage co operating struts 118 and 119 of lower part 102 and assists in aligning upper part 160 and lower part 102. Struts 126 and 127 are preferably timber and run at least part of but preferably the full length of the interior section of the lid. The timber is securely screwed in position through the wall material along the selected length of the struts. As shows in FIG. 19 struts 126 and 127 are cut at an angle to fit firmly into corresponding grooves 130 and 131 in struts 118 and 119 the triangular shaped groove created by the framing of the base of the pod & is designed to hold the lid in place when positioned on the base section of the pod.

Figure 20:
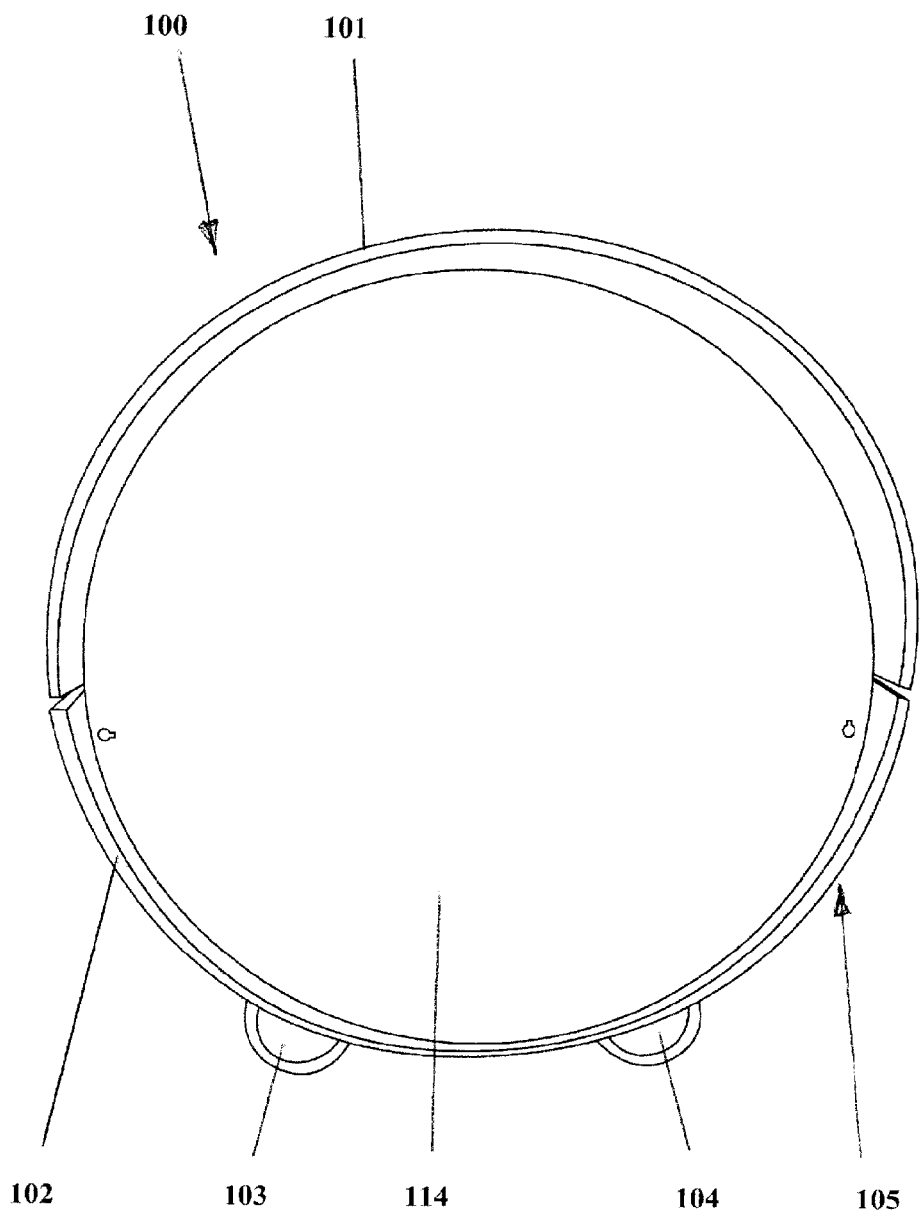
FIG. 20 shows an end elevation of the coffin assembly fully assembled.

FIG. 20 shows with corresponding numbering an end elevation of the coffin assembly 100 fully assembled. From this view the geometry of the ground engaging supports 103 and 104 and their radial relationship can be seen and it is apparent that the radial disposition imparts stability and prevents rotation. Internal space 111 (see FIG. 17) is closed by end closure wall 114.

All rails and struts described herein can be abbreviated as required but are preferably sized to run the full length of the coffin to maximise support and resistance to lateral instability and to provide increased wall reinforcing.

The coffin described is particularly suited to low cost burials and funerals and is particularly beneficial in natural disasters and wars with mass casualties. This is due in part to the lower materials and labour costs making it comparable to the cost of a simple cardboard box for the purpose of cremation/burial of the deceased.

The assembly described above has a number of advantages over the prior art arrangements which include the following; it is durable, lightweight, stackable economic and environmentally friendly.

It will be recognised by persons skilled in the art that numerous variations and modification may be made to the invention broadly described herein without departing from the overall spirit and scope of the invention.

The invention claimed is:

1. A coffin assembly for use in the containment and storage of a human or animal corpse, the coffin assembly comprising:
   a tubular housing comprising a wall defining an internal space, the wall formed from a biodegradable cellulose fiber and capable of retaining the corpse in the internal space, the tubular housing including removable end walls; and
   at least one ground engaging formation which supports the coffin assembly and provides resistance against rotation;

wherein the housing receives and retains therein a receptacle capable of removal from the housing axially;

wherein the tubular housing is formed in two parts comprising an upper part and a co-operating lower part, each formed by a longitudinal cut at an equatorial region along the housing; the upper part and co-operating lower part each having curved circumferential walls terminating in reinforced free end edges;

wherein, the reinforced free end edges provide co-operating formations which facilitate inter engagement between the upper part and the co-operating lower part; and wherein, open ends of the tubular housing are each closed using the end walls to accommodate the profile of the open ends, the tubular housing formed prior to introduction of the longitudinal cut, from a wound spiral of said cellulose fiber material.

2. The coffin assembly according to claim 1, wherein the at least one; ground engaging formation is at least one saddle which receives and retains a contour of the lower part of the tubular housing.

3. The coffin assembly according to claim 2, wherein the end walls are screwed to the reinforced free end edges in the tubular housing.

4. The coffin assembly according to claim 1, wherein the at least one ground engaging formation comprises radially disposed formations each including timber rails fixed to the curved circumferential wall.

5. The coffin assembly according to claim 4, wherein the timber rails are covered and concealed using the same material of construction of the tubular housing.

6. The coffin assembly according to claim 5, wherein the free end edges are reinforced using timber struts.

7. The coffin assembly according to claim 5, wherein the free end edges are reinforced by a thickening in the wall at or near the free end edges.

8. The coffin assembly according to claim 5, wherein the free end edges are reinforced by an inward fold over return along at least part of the length of the free end edge.

9. The coffin assembly according to claim 8, wherein the upper part and co-operating lower part have similar dimensions when viewed in cross section.

10. The coffin assembly according to claim 9, wherein the removable end walls are made from plywood.

* * * * *